United States Patent
Dadheech et al.

(10) Patent No.: US 9,431,665 B2
(45) Date of Patent: Aug. 30, 2016

(54) SELECTIVELY COATED BIPOLAR PLATES FOR WATER MANAGEMENT AND FREEZE START IN PEM FUEL CELLS

(71) Applicant: GM Global Technology Operations LLC, Detroit, MI (US)

(72) Inventors: Gayatri Vyas Dadheech, Rochester Hills, MI (US); Mahmoud H. Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 14/142,222

(22) Filed: Dec. 27, 2013

(65) Prior Publication Data

US 2014/0113217 A1  Apr. 24, 2014

Related U.S. Application Data

(62) Division of application No. 12/727,600, filed on Mar. 19, 2010, now Pat. No. 8,617,759.

(51) Int. Cl.
*H01M 8/24* (2016.01)
*H01M 8/02* (2016.01)
*H01M 8/10* (2016.01)

(52) U.S. Cl.
CPC ......... *H01M 8/0245* (2013.01); *H01M 8/0206* (2013.01); *H01M 8/0213* (2013.01); *H01M 8/0221* (2013.01); *H01M 8/0226* (2013.01); *H01M 8/0228* (2013.01); *H01M 8/0234* (2013.01); *H01M 8/0239* (2013.01); *H01M 8/0243* (2013.01); *H01M 2008/1095* (2013.01); *Y02E 60/50* (2013.01)

(58) Field of Classification Search
CPC .......... H01M 8/0204; H01M 8/0213; H01M 8/0214; H01M 8/0223; H01M 8/0228; H01M 8/0245; H01M 8/0206; H01M 8/0221; H01M 8/0226; H01M 8/0234; H01M 8/0239; H01M 8/0243; H01M 8/0258; H01M 8/026; H01M 2008/1095; Y02E 60/50
See application file for complete search history.

(56) References Cited

U.S. PATENT DOCUMENTS

| | | |
|---|---|---|
| 7,622,211 B2 | 11/2009 | Vyas et al. |
| 2006/0105222 A1 | 5/2006 | Abd Elhamid et al. |
| 2006/0216570 A1 | 9/2006 | Vyas et al. |
| 2006/0216571 A1 | 9/2006 | Vyas et al. |
| 2006/0257712 A1 | 11/2006 | Elhamid et al. |

(Continued)

FOREIGN PATENT DOCUMENTS

| | | |
|---|---|---|
| CN | 101317292 A | 12/2008 |
| CN | 101582516 A | 11/2009 |

(Continued)

OTHER PUBLICATIONS

Kenneth K. S. Lau et al., "Superhydrophobic Carbon Nanotube Forests", Nano Letters, 2003, 5 pgs., vol. 3, No. 12, 1701-1705.

*Primary Examiner* — Raymond Alejandro
(74) *Attorney, Agent, or Firm* — Brooks Kushman P.C.

(57) ABSTRACT

A flow field plate for fuel cell applications includes an electrically conductive plate having a first surface defining a plurality of channels. An active area section and an inactive area section characterize the flow field channels. A hydrophobic layer is disposed over at least a portion of the inactive area section while a hydrophilic layer is disposed over at least a portion of the active area section.

17 Claims, 4 Drawing Sheets

(56) References Cited

U.S. PATENT DOCUMENTS

| | | |
|---|---|---|
| 2007/0031724 A1* | 2/2007 | Huang .......................... 429/44 |
| 2007/0196723 A1* | 8/2007 | Jeon et al. ..................... 429/43 |
| 2007/0287057 A1 | 12/2007 | Elhamid et al. |
| 2008/0248370 A1 | 10/2008 | Abd Elhamid et al. |
| 2009/0087716 A1 | 4/2009 | Abd Elhamid et al. |
| 2009/0092874 A1 | 4/2009 | Abd Elhamid et al. |
| 2009/0169947 A1 | 7/2009 | Laurent et al. |
| 2009/0286132 A1 | 11/2009 | Blunk et al. |

FOREIGN PATENT DOCUMENTS

| | | |
|---|---|---|
| DE | 10 2009 012995 A1 | 10/2009 |
| WO | 2007060527 A2 | 5/2007 |
| WO | 2007/118945 | 10/2007 |

\* cited by examiner

SELECTIVELY COATED BIPOLAR PLATES FOR WATER MANAGEMENT AND FREEZE START IN PEM FUEL CELLS

CROSS-REFERENCE TO RELATED APPLICATION

This application is a division of U.S. application Ser. No. 12/727,600 filed Mar. 19, 2010, now U.S. Pat. No. 8,617,759 issued Dec. 31, 2013, the disclosure of which is hereby incorporated in its entirety by reference herein.

TECHNICAL FIELD

The present invention relates to fuel cell assemblies with improved water management properties.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate.

For water management, it is desirable for metal bipolar plates to have a low contact angle at the bipolar plate/water border; that is, a contact angle less than 40°. Titanium nitride coatings have been proposed as corrosion-resistant plating for bipolar plates. Although titanium nitride coatings are cost-effective, such coatings do not provide satisfactory protection for the bipolar plate material. Further, titanium nitride coatings develop relatively low water affinity with a contact angle close to 60°. Hydrophilic coatings have improved the water management in PEM fuel cells and the occurrence of low performing cells ("LPC"). Examples of hydrophilic coatings for these applications include bilayered structures as in $SiO_2$/Au coatings and titania nanotubes and nanoparticle coatings, see, for example, US2009/0087716 and US2009/0092874. More recently, various hydrophilic carbon coatings have been used.

Although these hydrophilic coatings work reasonably well, water accumulation at the exit region of the plates makes it difficult to start a fuel cell stack after a frozen cycle. Hydrophilic coatings in the exit manifold region, however, help the overall performance and water management but require additional purging cycles for freeze starts and these purge cycles can be long which is not efficient for the overall stack system.

Accordingly, there is a need for improved methodology for water management properties at the surfaces of bipolar plates used in fuel cell applications.

SUMMARY OF EXEMPLARY EMBODIMENTS OF THE INVENTION

The present invention solves one or more problems of the prior art by providing a flow field plate for fuel cell applications. The flow field plate of this embodiment includes an electrically conductive plate having a first surface defining a plurality of channels. An active area section and an inactive area section characterize the flow field channels. A hydrophobic layer is disposed over at least a Portion of the inactive area section.

In another embodiment, a flow field plate for fuel cell applications is provided. The flow field plate of this embodiment includes an electrically conductive plate having a first surface defining a plurality of channels. An active area section and an inactive area section characterize the flow field channels. A hydrophobic layer is disposed over at least a portion of the inactive area section while a hydrophilic layer is disposed over at least a portion of the active area section.

In another embodiment, a fuel cell incorporating the flow field plates set forth above is provided. The fuel cell comprises a first flow field plate having a first surface defining a plurality of flow field channels and a second flow field plate having a second surface defining a plurality of channels. Each of the channels in the first and second flow field plates has an active area region section and an inactive area region section. A membrane electrode assembly is interposed between the first and second flow field plates.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventor. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of component.

In an embodiment of the present invention, a flow field plate for fuel cell applications is provided. The fuel cell plate of this embodiment includes an electrically conductive plate having a first surface defining a plurality of channels. An active area section and an inactive area section characterize the flow field channels. A hydrophobic layer is disposed over at least a portion of the inactive area section. In one variation, a hydrophilic layer is disposed over at least a portion of the active area section.

Figure 1:
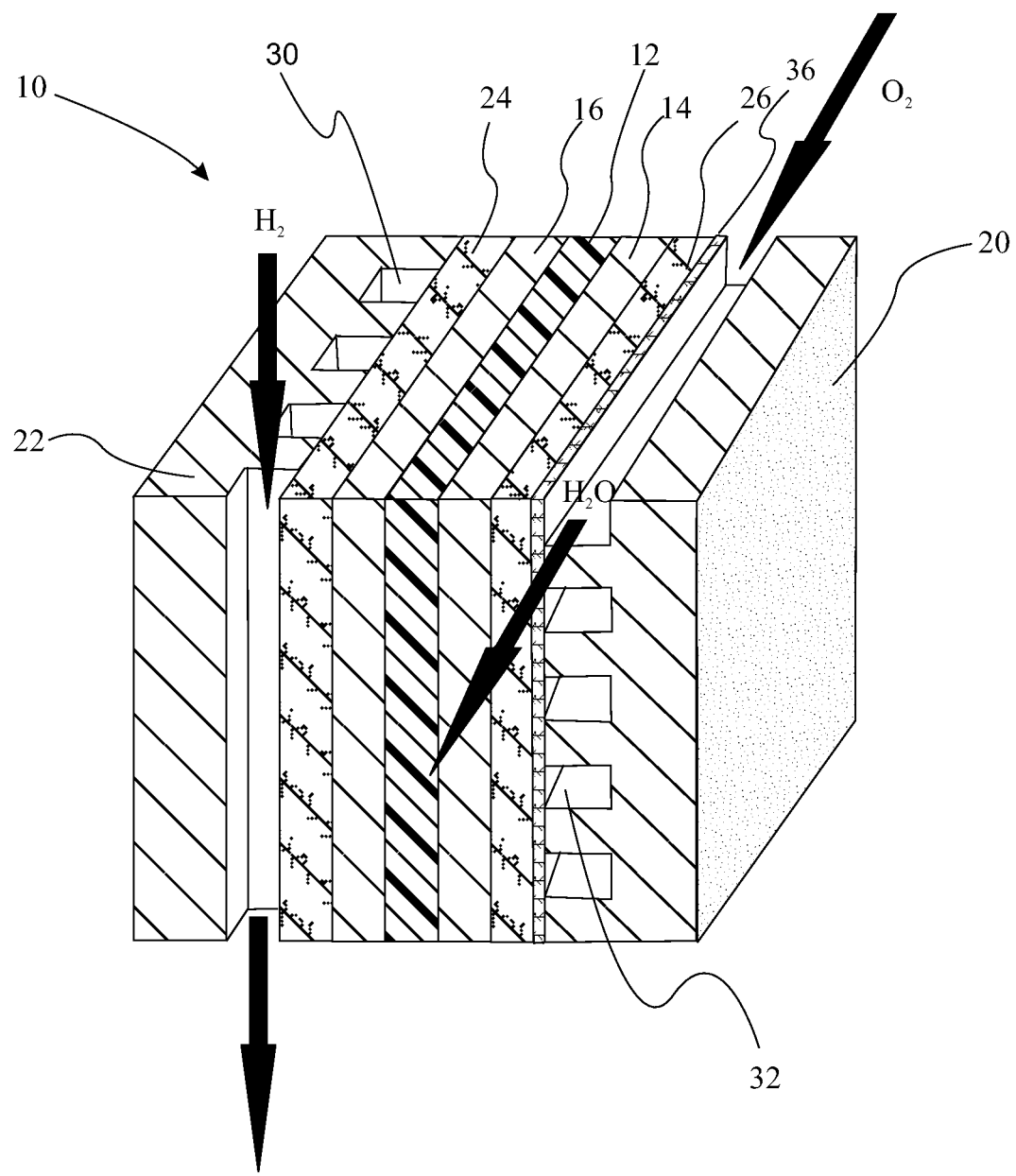
FIG. 1 provides a perspective of a fuel cell that incorporates an embodiment of a flow field plate.

With reference to FIG. 1, a fuel cell that incorporates flow field plates of an embodiment of the present invention is provided. PEM fuel cell 10 includes polymeric ion conductive membrane 12 disposed between cathode catalyst layer 14 and anode catalyst layer 16. Collectively, polymeric ion conductive membrane 12, cathode catalyst layer 14, and anode catalyst layer 16 define a membrane electrode assembly ("MEA"). Fuel cell 10 also includes flow field plates 20, 22, gas channels 30, 32, and gas diffusion layers 24 and 26. Flow field plates 20, 22 are electrically conductive. Advantageously, the present invention provides embodiments for flow field plates 20, 22 with improved water management properties. In another variation, fuel 10 also includes microporous layer 36 which is applied to gas diffusion layer 26. In this variation, microporous layer 36 comprises the hydrophobic layers set forth below.

Figure 2:
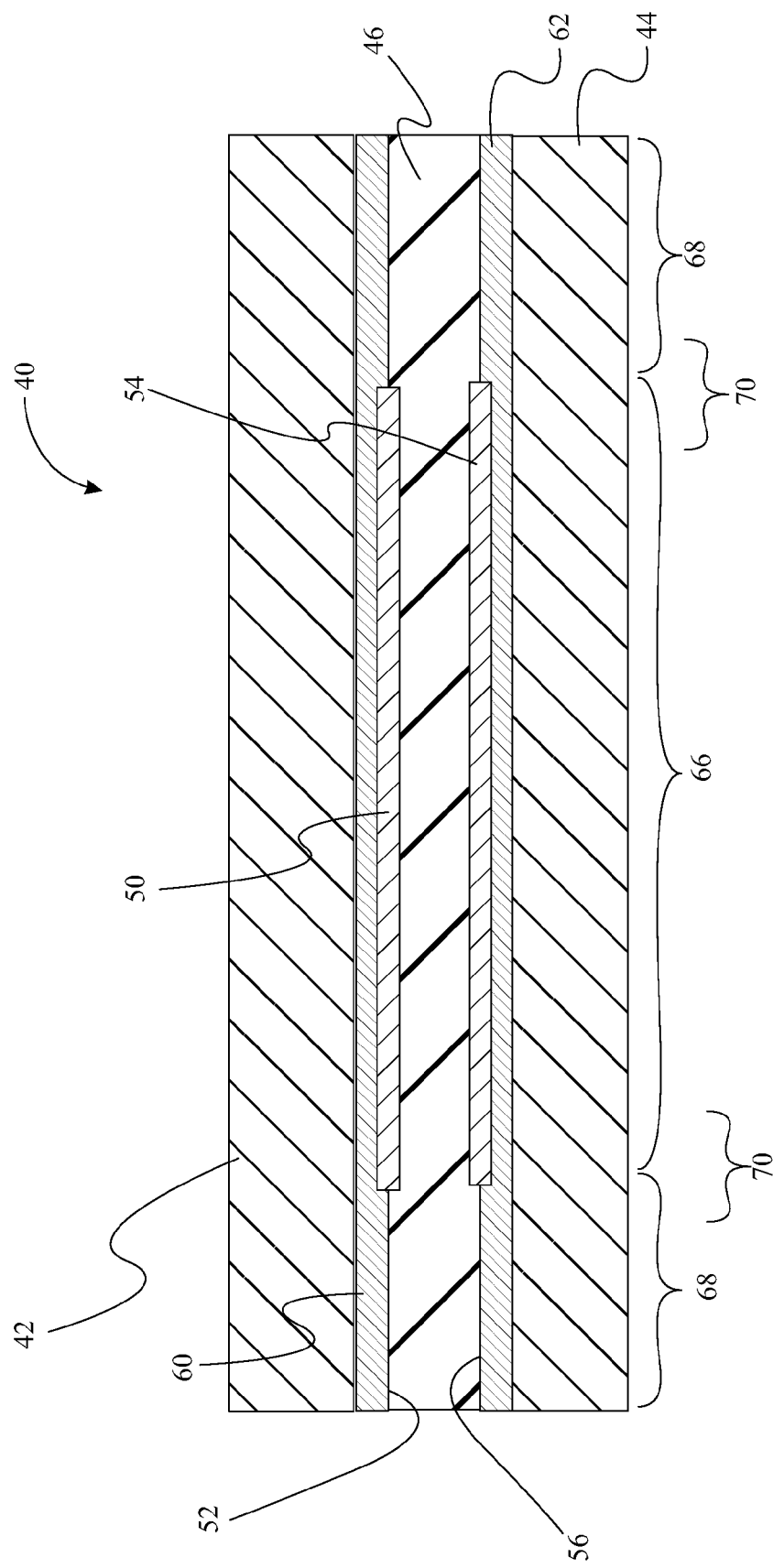
FIG. 2 is a schematic cross section of a fuel cell incorporating an embodiment of the flow field plates.
Figure 3:
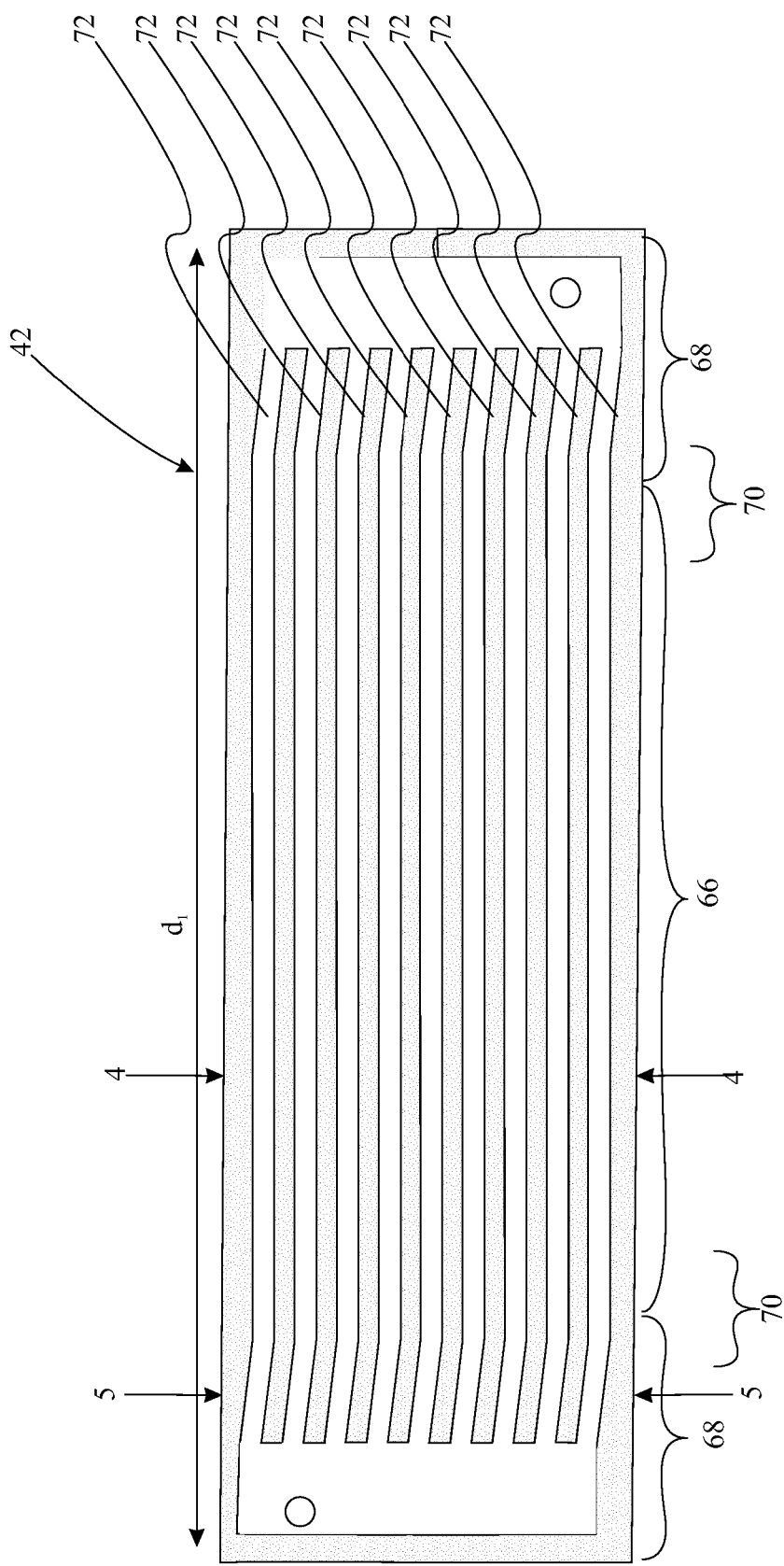
FIG. 3 is a schematic top view of a fuel cell incorporating an embodiment of the flow field plates.

With reference to FIGS. 2 and 3, schematic illustrations of a flow field plate used in fuel cell applications are provided. FIG. 2 is a schematic cross section of a fuel cell incorporating an embodiment of the flow field plates. FIG. 3 is a schematic top view of a fuel cell incorporating an embodiment of the flow field plates. PEM fuel cell 40 includes flow field plates 42, 44. FIG. 3 is an exemplary top view of flow field plate 42. Fuel cell 40 includes ion conducting membrane 46. Anode layer 50 contacts ion conducting membrane 46 on side 52 while cathode layer 54 contacts ion conducting membrane 46 on side 56. In one refinement, anode layer 50 and cathode layer 54 are deposited onto ion conducting membrane 46. Typically, gas diffusion layer 60 is interposed between flow field plate 42 and anode layer 50 and gas diffusion layer 62 is interposed between flow field plate 44 and cathode layer 54. Fuel cell 40 includes active area region 66 and inactive area region 68. Active area region 66 is the interior section of fuel cell 40 at which the electrochemical reactions are occurring. Active area region 66 is characterized by the presence of the catalysts layers (i.e., anode layer 50 and cathode layer 54) disposed over ion conducting membrane 46. Inactive area regions 68 are peripheral to active area region 66 along direction $d_1$ and are characterized by the absence of catalyst layers. Intermediate region 70 is defined herein as that region proximate to the both active area region 66 and inactive area region 68.

Figure 4A:
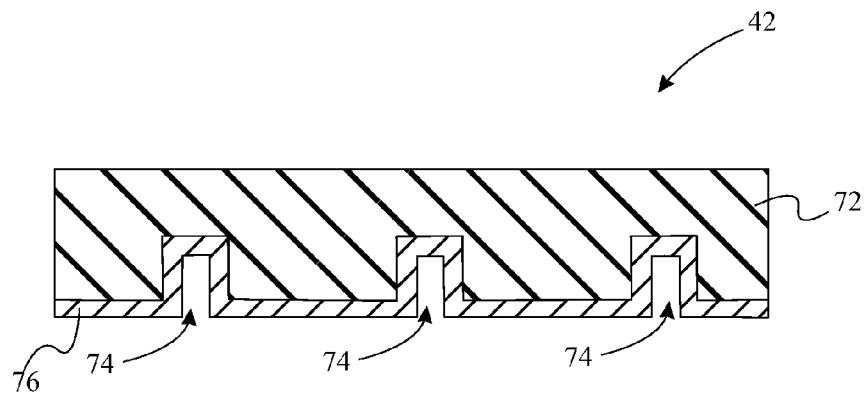
FIG. 4A is a cross section of a unipolar flow field plate coated with a hydrophilic coating.
Figure 4B:
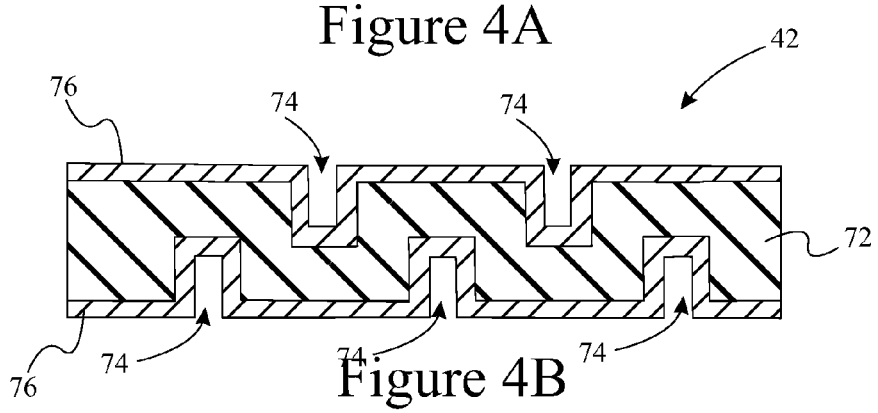
FIG. 4B is a cross section of a bipolar flow field plate coated with a hydrophilic coating.
Figure 5A:
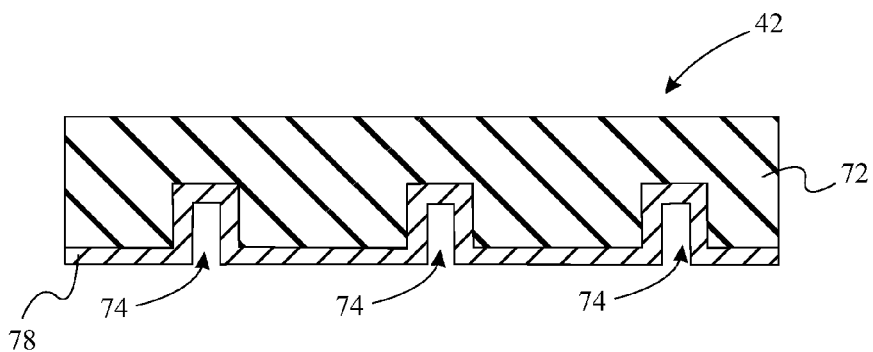
FIG. 5A is a cross section of a unipolar flow field plate coated with a hydrophobic coating.
Figure 5B:
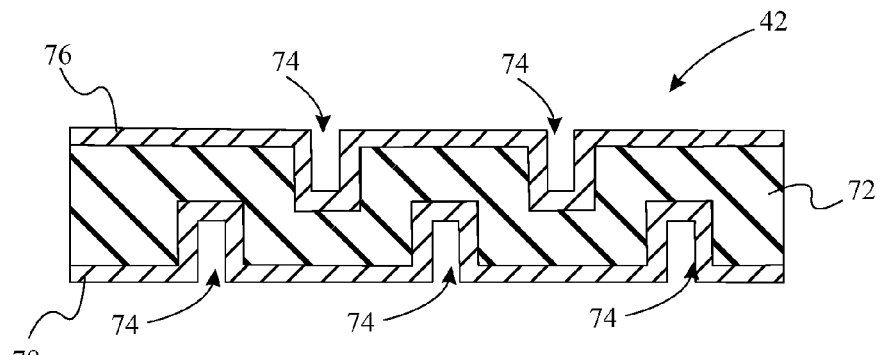
FIG. 5B is a cross section of a bipolar flow field plate coated with a hydrophobic coating.

With reference to FIGS. 3, 4A, 4B, 5A, and 5B, schematic illustrations of embodiments in which gas flow channels are coated with hydrophilic and hydrophobic coatings are provided. FIGS. 4A and 5A provide cross sections of a variation in which flow field plate 42 is a unipolar plate. FIGS. 4B and 5B provide cross sections of a variation in which flow field plate 42 is a bipolar plate. Flow field plate 42 includes metal plate 72 and flow field channels 74 which direct the input gases towards active area region 66. Channels 74 are coated with hydrophilic layer 76 in active area region 66 and with hydrophobic layer 78 in inactive area region 68. In one refinement, hydrophilic layer 76 comprises a carbon layer that is optionally treated with a plasma to enhance hydrophilicity. Suitable carbon layers include graphitic carbon layers, amorphous carbon layers, and combinations thereof. The details of forming such a hydrophilic layer are set forth in U.S. Pat. Appl. Nos. 2006/0257712, 2009/0286132, 2008/0248370, 2007/0287057, 2006/0216571, 2006/0216570, 2006/0105222, and U.S. Pat. No. 7,622,211, the entire disclosures of these applications and patent are hereby incorporated by reference. In another variation, hydrophilic layer 76 comprises a precious metal (e.g., gold) over-coated with silica.

With reference to FIGS. 3, 5A, and 5B, schematic illustrations of flow field channels coated with a hydrophobic layer are provided. The sections of channels 74 within inactive area region 68 are coated with hydrophobic layer 78. As is known to one skilled in the art, the hydrophilicity and hydrophobicity of a layer is related to the surface energy of the material under consideration. In the present variation, the surface energy of hydrophobic layer 78 is less than the surface energy of hydrophilic layer 76. In a refinement, the surface energy in intermediate layer 70 provides a smooth transition from the relatively high value of hydrophilic layer 76 to the relatively low value of hydrophobic layer 78. For example, this transition may be a monotonic change over 1 to 3 centimeters. In another variation, the transition may be abrupt occurring over a distance of 0.1 to 1 centimeters. The surface energy transition acts to minimize the back draft of water in a fuel cell stack thereby ensuring that water is completely removed from the stack before shut down. This in turn allows for improved freeze start of the fuel cell.

In a variation of the present embodiment, hydrophilic layer 76 has a surface energy greater than about 50 dyne/cm. In a refinement, hydrophilic layer 76 has a surface energy from about 50 to about 100 dyne/cm. In another refinement, hydrophilic layer 76 has a contact angle less than about 50 degrees. In still another refinement, hydrophilic layer 76 has a contact angle less than about 30 degrees. In still another refinement, hydrophilic layer 76 has a contact angle from about 5 degrees to about 30 degrees.

In another variation, hydrophobic layer 78 has a surface energy less than about 40 dyne/cm. In a refinement, hydrophobic layer 78 has a surface energy from about 5 to about 40 dyne/cm. In another refinement, hydrophobic layer 78 has a surface energy from about 10 to about 30 dyne/cm. In still another refinement, hydrophobic layer 78 has a surface energy from about 10 to about 25 dyne/cm. In another refinement, hydrophobic layer 78 has a contact angle greater than about 50 degrees. In still another refinement, hydrophobic layer 78 has a contact angle greater than about 75 degrees. In still another refinement, hydrophobic layer 78 has a contact angle greater than about 100 degrees. In yet another refinement, hydrophobic layer 78 has a contact angle from about 80 degrees to about 160 degrees.

Examples of suitable materials for hydrophobic layer 78 or microporous layer 36 are combinations of low surface energy polytetrafluoroethylene (PTFE) and carbon nanotube coatings. PTFE is intrinsically a hydrophobic material with very low surface energy of 19 dyne/cm. In one variation, the PTFE is present in an amount from about 90 to about 99 percent of the combined weight of PTFE and carbon nanotubes. In another variation, the PTFE is present in an amount from about 95 to about 98 percent of the combined weight of PTFE and carbon nanotubes. In another variation, the carbon nanotubes are present in an amount from about 0.5 to about 10 percent of the combined weight of PTFE and carbon nanotubes. In another variation, the carbon nanotubes are present in an amount from about 1 to about 5 percent of the combined weight of PTFE and carbon nanotubes. Other materials that are used in combination with carbon nanotubes to produce hydrophobic layers are provided in Table 1:

TABLE 1

Hydrophobic materials.

| Surface Energy Material | (dynes/cm) |
|---|---|
| Polyhexafluoropropylene | 16 |
| Polytetrafluoroethylene (PTFE/Teflon) | 18-20 |
| Fluorinated ethylene propylene (FEP) | 18-22 |
| Polytrifluoroethylene | 22 |
| Chlorotrifluoroethylene (Aclar) | 20-24 |

It should be appreciated that combinations of the materials in Table 1 may also be used. Moreover, the coating in intermediate region 70 may also comprise these materials.

The following examples illustrate the various embodiments of the present invention. Those skilled in the art will recognize many variations that are within the spirit of the present invention and scope of the claims.

A 30% PTFE solution from Dupont is used for these experiments. Carbon nanotubes are purchased from VWR. Carbon nanotubes are selectively sprayed/brushed or coated in the tunnel and/or non-active area. Subsequently, the samples are brushed/dipped in PTFE solution and sintered at 380° C. for 5 minutes. In a variation, a solution of 1 wt % carbon nanotubes in 30 wt % Teflon is used to apply the hydrophobic coating on the plate.

Coated samples show good adhesion and are superhydrophobic. Carbon nanotubes provide a unique role in the present example. The nanotubes not only bind the PTFE particles together but also provide the right morphology for making this coating super-hydrophobic. The roughness created by carbon nanotubes with intrinsic high contact angles of PTFE gives a super-hydrophobic surface which does not wet the plates and shows no pinning. The contact angle of the material with PTFE-carbon nanotubes is greater than 125 degrees.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flow field plate for fuel cell applications, the flow field plate comprising:
    an electrically conductive plate having a first surface defining a plurality of channels, each channel having an active area section and a peripheral section, the active area section being configured to be placed at an interior section of a fuel cell at which electrochemical reactions are occurring characterized by presence of catalyst layers and the peripheral section being configured to be placed peripheral to active area section in a fuel cell characterized by absence of catalyst layers;
    a hydrophilic layer disposed only over a portion of the active area section; and
    a hydrophobic layer disposed only over a portion of the peripheral section.

2. The flow field plate of claim 1 further comprising a transition region positioned between the active area section and the peripheral section.

3. The flow field plate of claim 1 wherein the hydrophobic layer has a surface energy less than about 40 dyne/cm.

4. The flow field plate of claim 1 wherein the hydrophobic layer has a contact resistance greater than about 50 degrees.

5. The flow field plate of claim 1 wherein the hydrophobic layer has a contact resistance greater than about 100 degrees.

6. The flow field plate of claim 1 wherein the hydrophobic layer comprises carbon nanotubes.

7. The flow field plate of claim 1 wherein the hydrophobic layer further comprises a component selected from the group consisting of polyhexafluoropropylene, polytetrafluoroethylene, fluorinated ethylene propylene polytrifluoroethylene, chlorotrifluoroethylene, and combinations thereof.

8. The flow field plate of claim 1 wherein the hydrophilic layer has a surface energy greater than about 50 dyne/cm and a contact angle less than about 50 degrees.

9. The flow field plate of claim 1 wherein the hydrophilic layer comprises a carbon layer.

10. The flow field plate of claim 9 wherein the carbon layer is treated with a plasma.

11. The flow field plate of claim 7 wherein the hydrophilic layer comprises a carbon layer.

12. The flow field plate of claim 1 wherein the hydrophilic layer comprises a precious metal over-coated with a silica layer.

13. A flow field plate for fuel cell applications, the flow field plate comprising:

an electrically conductive plate having a first surface defining a plurality of channels, each channel having an active area region and a peripheral inactive area region; the active area region being configured to be placed at an interior section of a fuel cell at which electrochemical reactions are occurring characterized by presence of catalyst layers and the peripheral inactive area region being configured to be placed peripheral to active area region in a fuel cell characterized by absence of catalyst layers; and a hydrophobic layer disposed only over a portion of the peripheral inactive area region.

14. The flow field plate of claim 13 wherein the hydrophobic layer has a surface energy less than about 40 dyne/cm.

15. The flow field plate of claim 13 wherein the hydrophobic layer has a contact resistance greater than about 100 degrees.

16. The flow field plate of claim 13 wherein the hydrophobic layer comprises carbon nanotubes.

17. The flow field plate of claim 13 wherein the hydrophobic layer further comprises a component selected from the group consisting of polyhexafluoropropylene, polytetrafluoroethylene, fluorinated ethylene propylene polytrifluoroethylene, chlorotrifluoroethylene, and combinations thereof.

* * * * *